Figure 1:
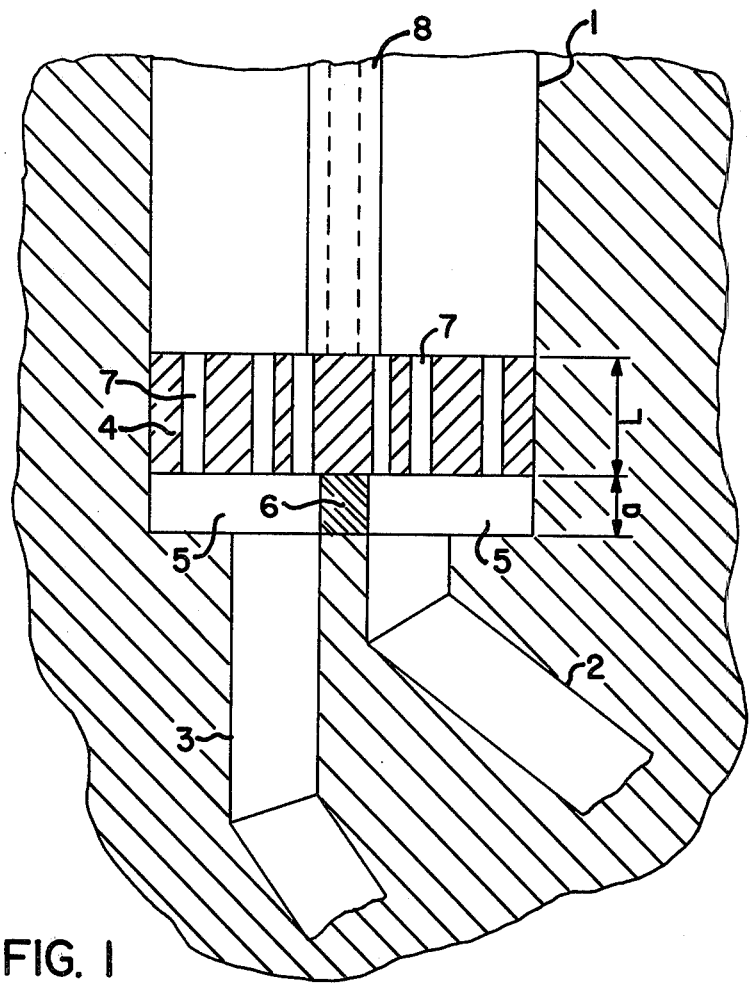

United States Patent [19]

Struck et al.

[11] 4,435,152
[45] Mar. 6, 1984

[54] APPARATUS FOR IMPROVING THE FLOW OF GASES TO A COMBUSTION CHAMBER OF A COKE OVEN OR THE LIKE

[75] Inventors: Carl-Heinz Struck, Bochum; Ralf Schumacher, Hagen, both of Fed. Rep. of Germany

[73] Assignee: Dr. C. Otto & Comp. GmbH, Bochum, Fed. Rep. of Germany

[21] Appl. No.: 306,151

[22] Filed: Sep. 28, 1981

[30] Foreign Application Priority Data

Oct. 8, 1980 [DE] Fed. Rep. of Germany ....... 3037956

[51] Int. Cl.³ .............................................. F23D 21/00
[52] U.S. Cl. .................... 431/170; 431/326; 202/140; 202/151
[58] Field of Search ............... 431/190, 195, 198, 217, 431/5, 202, 215, 170, 326, 242, 247; 110/210; 202/96, 111, 122, 140, 151

[56] References Cited

U.S. PATENT DOCUMENTS 3,229,746 1/1966 Wagner et al. ..................... 431/170
3,339,613 9/1967 Saha .................................. 431/190

FOREIGN PATENT DOCUMENTS 1098914 2/1961 Fed. Rep. of Germany ...... 202/151
54-44232 4/1979 Japan .................................. 431/190
2079439 6/1980 United Kingdom ............... 431/190
222997 10/1968 U.S.S.R. ............................ 431/326

Primary Examiner—Samuel Scott
Assistant Examiner—Allen J. Flanigan
Attorney, Agent, or Firm—Thomas H. Murray; Clifford A. Poff

[57] ABSTRACT

A heating flue for a coke oven includes a flow plate to replace the base in the heating flue. The thickness of the flow plate is greater than the thickness of the flue base and disposed above a chamber which is divided into two halves in a gas-tight manner by a central web of refractory material. Each chamber communicates with ducts that feed preheated air from regenerators during rich-gas firing and feed preheated air and lean gas during firing with lean gas. The height of the chamber to the thickness of the flow plate is a ratio within 0.3 to 0.7, preferably 0.5. The flow plate has a plurality of bores each with a cross-sectional area which, when compared with the cross-sectional area of the plate, forms a ratio of between 20 and 200, preferably 30 to 60. The diameter of a cylindrical bore is between 10 and 60 millimeters, preferably 20 and 50 millimeters.

7 Claims, 2 Drawing Figures

APPARATUS FOR IMPROVING THE FLOW OF GASES TO A COMBUSTION CHAMBER OF A COKE OVEN OR THE LIKE

BACKGROUND OF THE INVENTION

This invention relates to an apparatus for improving the flow characteristics of gases fed from ducts into a combustion chamber of an industrial gas-fired system, particularly a coke oven, which includes regenerative or recuperative recovery of heat from waste gases of the combustion process. More particularly, the present invention relates to such an apparatus for conducting preheated gases into heating flues from ducts communicating with the outlet of a heat exchanger; such gases comprising air when rich gas is used for the combustion process or air and lean gas when lean gas is used for the combustion process.

An industrial gas-fired system using regenerative or recuperative recovery of heat from waste gases, particularly when rich gas is used to fire the system, is subject to constructional constraints due to the physical arrangement of the ducts required to convey the preheated combustion media from the regenerator or recuperator outlets of the combustion chambers. Because of these constraints, it is difficult to obtain uniform combustion with a uniform elongated flame. For example, the ducts in coke oven batteries are at a relatively acute angle to the horizontal because of structural requirements in the arrangement of regenerator cells depending, of course, on the heating system. The ducts terminate with a relatively short vertical duct portion leading to the heating flues. Usually, the length of the vertical duct portion is insufficient to obtain a uniform flow of gases in the cross section of the gas stream. Moreover, the length of the vertical duct portion is insufficient to obtain guiding for the gas stream so that the stream is vertical when entering the flue. Indeed, tests on models have shown that a stream of preheated combustion air drifts to a relatively considerable extent from the vertical when it enters the base of the heating flue. This results in a strong turbulence in the lower part of the heating flue which is intensified by a horizontal velocity component in the gas stream because of a sudden increase to the diameter of the stream upon entering the heating flue. An intensive spontaneous mixing of the combustion gas and air occurs which brings about an excessive local flame temperature. In many industrial gas-fired systems, such an excessive flame temperature, even if it is locally limited, increases the formation of $NO_x$. Tests on flow models have also shown that the drift of inflowing combustion air in the gas stream continues to higher regions of the flues, thus preventing a uniform vertical temperature distribution.

SUMMARY OF THE INVENTION

It is an object of the present invention to avoid the aforementioned disadvantages and equalize the flow of gaseous media supplied from the regenerators when or before the media enter a flue or combustion chamber and to cause the media to flow vertically; thereby obtaining homogeneous inflow and a uniform total flow of all the gaseous reactants entering the combustion chamber while maintaining the conventional physical construction for the combustion system and substantially avoiding pressure losses.

According to the present invention, a conventional heating flue base is replaced by a flow plate, preferably including cylindrical bores, the flow plate being somewhat thicker than the flue base and disposed above a chamber which is divided into two halves in a gas-tight manner by a central refractory web with each half communicating with a duct, the ratio of the height of the chamber to the thickness of the plate being in the range of 0.3 to 0.7, preferably 0.5.

Figure 2:
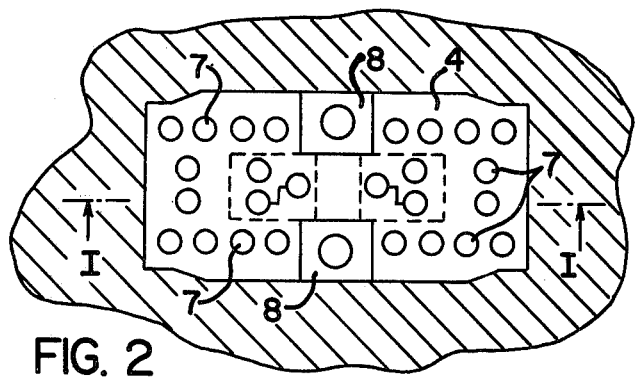

These features and advantages of the present invention as well as others will be more fully understood when the following description is read in light of the accompanying drawing, in which:

FIG. 1 is a sectional view taken along line II—II of FIG. 2 and diagrammatically illustrating the bottom portion of a heating flue for a coke oven; and FIG. 2 is a plan view of a flow plate at the bottom portion of a heating flue for a coke oven.

In FIG. 1, there is illustrated two ducts identified by the reference numerals 2 and 3 that open into the bottom part of a heating flue 1. The ducts are part of a plurality of ducts that connect the individual heating flues in the walls between the coke oven chambers to regenerators disposed beneath a regenerator covering in a manner, per se, well known in the art. The ducts as shown in FIG. 1, according to conventional practice, comprise an obliquely-rising portion extending to a vertical portion which terminates at the base of the heating flue. When the coke oven is fired with rich gas, preheated air is supplied to the heating flue by both of the ducts 2 and 3. On the other hand, when the coke oven is fired with lean gas, air is supplied to the heating flue through one of the ducts 2 or 3 and lean gas is supplied through the other of these ducts.

According to the present invention, the base in a conventional heating flue is replaced by an oncoming flow plate 4 which embodies a thickness somewhat greater than the base and is mounted so that a free space 5 is formed between the bottom surface of the plate and a wall surface forming the place where the ducts 2 and 3 enter the heating flue. Space 5 as shown in FIGS. 1 and 2 is divided into two halves by a web 6 in a gas-tight manner. The web is made of refractory material. According to the present invention as shown in FIG. 1, the ratio of the height a of space 5 to the thickness L of the plate 4 is between 0.3 and 0.7, preferably 0.5.

The flow plate 4 has a plurality of cylindrical bores 7 above both divided halves of the space 5. The bores are preferably cylindrical and the ratio of the cross-sectional area of plate 4 to the cross section of an individual bore is between 20 and 200, preferably 30 and 60. In the preferred form of the present invention, the diameter of the individual cylindrical bores is between 10 and 60 millimeters, preferably between 20 and 50 millimeters. In FIGS. 1 and 2, reference numeral 8 identifies two nozzle burners which supply rich gas to the heating flue during rich-gas firing of the coke oven.

Although the invention has been shown in connection with a certain specific embodiment, it will be readily apparent to those skilled in the art that various changes in form and arrangement of parts may be made to suit requirements without departing from the spirit and scope of the invention.

We claim as our invention:

1. Apparatus for conducting a flow of combustion gases from ducts into a heating flue of an industrial gas-fired system, such as a coke oven, which system includes recuperative waste-gas heat recovery means for preheating said combustion gases which comprise air when heating by combustion of rich gas and comprise air and lean gas when heating by combustion of lean gas; said heating flue having a lower end, a bottom wall, and an upper end; at least a portion of said combustion gases being introduced through said ducts from the outlet of said waste-gas heat recovery means into said lower end of said heating flue; said apparatus including the combination therewith of a flow plate mounted in said lower end of said heating flue and spaced from said bottom wall to form a chamber therebelow, and a central refractory web to divide said chamber into two halves in a gas-tight manner; each of the chamber halves communicating with one of said ducts; the height of said chamber to the thickness of said flow plate being in a ratio of within 0.3 to 0.7.

2. The apparatus according to claim 1 wherein said flow plate includes cylindrical bores for conducting said combustion gases.

3. The apparatus according to claim 1 wherein said ratio is 0.5.

4. The apparatus according to claim 2 wherein the ratio of the cross-sectional area of the flow plate to the cross-sectional area of one of said cylindrical bores is within the range of 20 to 200.

5. The apparatus according to claim 4 wherein said ratio is further defined by the range of 30 to 60.

6. The apparatus according to claim 2 wherein the diameter of said cylindrical bores in said flow plate is between 10 and 60 millimeters.

7. The apparatus according to claim 2 wherein the diameter of said cylindrical bores in said flow plate is between 20 and 50 millimeters.

* * * * *